US012417487B2

(12) United States Patent
Periyathambi et al.

(10) Patent No.: US 12,417,487 B2
(45) Date of Patent: Sep. 16, 2025

(54) SYSTEMS, METHOD, AND COMPUTER STORAGE MEDIUM FOR CREATING LISTING FOR ITEMS FOR SALE IN AN ELECTRONIC MARKETPLACE BASED ON VIDEO ANALYSIS

(71) Applicant: eBay Inc., San Jose, CA (US)

(72) Inventors: Ramesh Periyathambi, San Ramon, CA (US); Tomer Lancewicki, Parkland, FL (US); Sanjika Hewavitharana, Milpitas, CA (US); Ryan Reeves, Portland, OR (US); Senthil Kumar Padmanabhan, Los Gatos, CA (US); Daniel Stein, Sankt Augustin (DE); Luther S. Boorn, Milwaukie, OR (US); Baohao Liao, Aachen (DE); Simon Alexander Becker, Dusseldorf (DE); Sivan Elkis, Cologne (DE); Saral Bharathi Sukumar Jeyaseelan, Cupertino, CA (US)

(73) Assignee: eBay Inc., San Jose, CA (US)

( * ) Notice: Subject to any disclaimer, the term of this patent is extended or adjusted under 35 U.S.C. 154(b) by 5 days.

(21) Appl. No.: 17/562,423

(22) Filed: Dec. 27, 2021

(65) Prior Publication Data

US 2023/0206314 A1    Jun. 29, 2023

(51) Int. Cl.
*G06Q 30/06* (2023.01)
*G06F 40/295* (2020.01)
(Continued)

(52) U.S. Cl.
CPC ....... *G06Q 30/0643* (2013.01); *G06F 40/295* (2020.01); *G06Q 30/0613* (2013.01); *G06V 10/40* (2022.01)

(58) Field of Classification Search
CPC .......................... G06Q 30/06; G06Q 30/0643
See application file for complete search history.

(56) References Cited

U.S. PATENT DOCUMENTS 11,432,046 B1 *  8/2022  Ohliger ................. G06V 20/49
2009/0012878 A1 *  1/2009  Tedesco ............ G06Q 30/0623
                                                        705/27.2
(Continued)

FOREIGN PATENT DOCUMENTS

WO    2019/183061 A1    9/2019

OTHER PUBLICATIONS

Florez, O. U. (2013). Knowledge extraction in video through the interaction analysis of activities knowledge extraction in video through the interaction analysis of activities (Order No. 3587563). Retrieved from https://dialog.proquest.com/professional/docview/1427350585?accountid=131444.*

(Continued)

*Primary Examiner* — Jeffrey A. Smith
*Assistant Examiner* — Jennifer V Lee
(74) *Attorney, Agent, or Firm* — Shook Hardy & Bacon L.L.P.

(57) ABSTRACT

A system for assisting users in listing items for sale in an electronic marketplace is disclosed. A video is received from a user device associated with a user, the video including a video stream depicting a plurality of items to be listed for sale in the electronic marketplace. Respective images depicting respective items among the plurality of items are obtained from the video stream, and respective attributes of the respective items among the plurality of items are extracted from the video. Respective listings for sale of the respective items are generated based at least in part on the respective attributes of the respective items among the
(Continued)

plurality of items, and the respective listings for sale of the respective items are displayed to the user.

19 Claims, 8 Drawing Sheets

(51) Int. Cl.
  *G06Q 30/0601* (2023.01)
  *G06V 10/40* (2022.01)

(56) References Cited

U.S. PATENT DOCUMENTS

| | | |
|---|---|---|
| 2010/0217684 A1 | 8/2010 | Melcher et al. |
| 2011/0099085 A1* | 4/2011 | Hamilton ........... G06Q 30/0282 |
| | | 705/347 |
| 2014/0337174 A1* | 11/2014 | Lin .................... G06Q 30/0269 |
| | | 705/26.61 |
| 2017/0024791 A1* | 1/2017 | Klinger ................. H04L 67/535 |
| 2020/0151837 A1 | 5/2020 | Russell |
| 2022/0115043 A1* | 4/2022 | Gupta ................. G11B 27/031 |

OTHER PUBLICATIONS

Extended European Search Report Received for European Patent Application No. 22209585.3, mailed on Apr. 3, 2023, 10 pages.

* cited by examiner

SYSTEMS, METHOD, AND COMPUTER STORAGE MEDIUM FOR CREATING LISTING FOR ITEMS FOR SALE IN AN ELECTRONIC MARKETPLACE BASED ON VIDEO ANALYSIS

BACKGROUND

Various applications, such as electronic marketplace applications, are commonly utilized by users to perform various on-line tasks, such as selling and/or buying items in an electronic marketplace. In order to create a listing for an item for sale in the electronic marketplace, a user typically utilizes a computer or another device to provide various details about the item, to research the marketplace to determine an appropriate price for the item, etc. In some cases, a user may have multiple items that the user may wish to list for sale in the electronic marketplace. For example, a small business owner may wish to create an electronic store in the electronic marketplace and list their physical inventory for sale in the electronic marketplace. In cases in which a user needs to list multiple items for sale in the electronic marketplace, creating the multiple listings may be cumbersome and time consuming. Moreover, the user may be inapt in creating an electronic marketplace store and/or unable to perform necessary research, etc. due to lack of access to a computer, for example.

It is with respect to these and other general considerations that the aspects disclosed herein have been made. Although relatively specific problems may be discussed, it should be understood that the examples should not be limited to solving the specific problems identified in the background or elsewhere in this disclosure.

SUMMARY

Aspects of the present disclosure relate to systems and methods for creating multiple listings for sale in an electronic marketplace. In an aspect, a listing application may receive a video from a user device, such as a mobile phone equipped with a camera. The video may include depictions and audio descriptions of multiple items that the user wishes to list in the electronic marketplace. The listing application may identify the multiple items depicted in the video, obtain images (e.g., screen shots) of the items from the video, extract attributes of respective one of the multiple items from the content of the video, etc. The listing application may then automatically generate respective listings for the items using the images, item attributes, etc. extracted from the content of the video. The generated listings may then be displayed to the user for editing and/or approval by the user. In some aspects, the listing application may also generate an electronic marketplace store for the user, and may list the items in the electronic marketplace store. In these ways, the user may easily and efficiently list an inventory of multiple items in the electronic marketplace by simply recording a video depicting and describing the multiple items that the user wishes sell in the electronic marketplace.

In aspects, a system for assisting users in listing items for sale in an electronic marketplace is provided. The system comprises a processor and memory including instructions which, when executed by the processor, causes the processor to perform operations. The operations include receiving a video from a user device associated with a user, the video including a video stream depicting a plurality of items to be listed for sale in the electronic marketplace. The operations also include obtaining, from the video stream, respective images depicting respective items among the plurality of items and extracting, from the video, respective attributes of the respective items among the plurality of items. The operations further include generating, based at least in part on the respective attributes of the respective items among the plurality of items, respective listings for sale of the respective items. The operations additionally include causing the respective listings for sale of the respective items to be displayed to the user.

In further aspects, a method for customizing experience of a user of an electronic marketplace application is provided. The method includes receiving a video from a user device associated with a user, the video including a video stream depicting a plurality of items to be listed for sale in the electronic marketplace. The method also includes obtaining, from the video stream, respective images depicting respective items among the plurality of items, and extracting, from the video, respective attributes of the respective items among the plurality of items. The method further includes generating, based at least in part on the respective attributes of the respective items among the plurality of items, respective listings for sale of the respective items. The method additionally includes causing the respective listings for sale of the respective items to be displayed to the user.

In still further aspects, a computer storage medium is provided. The computer storage media encodes computer executable instructions that, when executed by at least one processor, perform a method. The method includes receiving a video from a user device associated with a user, the video including a video stream depicting a plurality of items to be listed for sale in the electronic marketplace. The method also includes obtaining, from the video stream, respective images depicting respective items among the plurality of items. The method further includes generating, based at least in part on the respective video images obtained from the video stream, respective listings for sale of the respective items. The method further still includes generating an electronic store for the user, the electronic store including the respective listings for sale of the respective items. The method additionally includes causing the electronic store to be displayed to at least one potential buyer.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

Figure 4A:
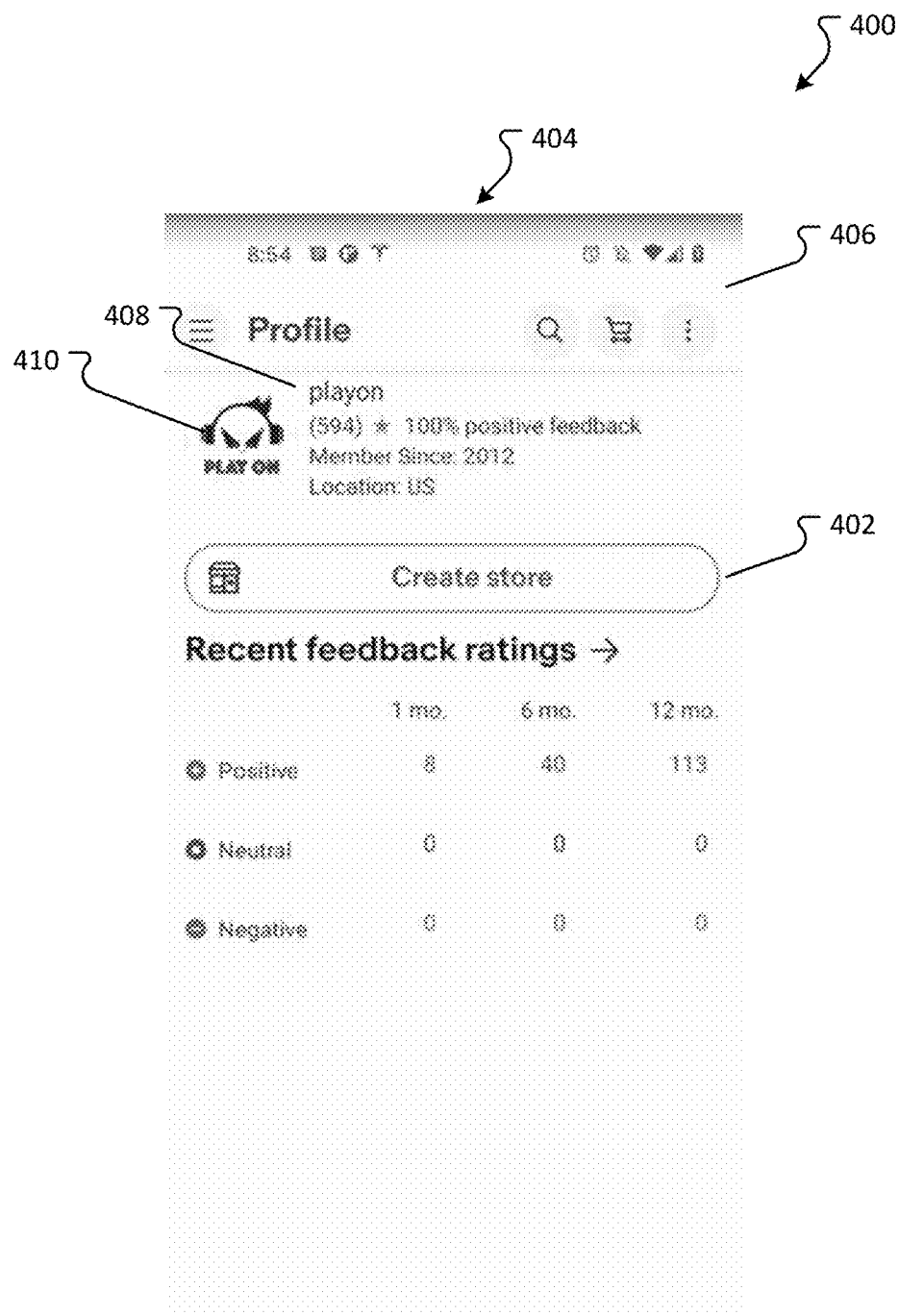
Figure 4B:
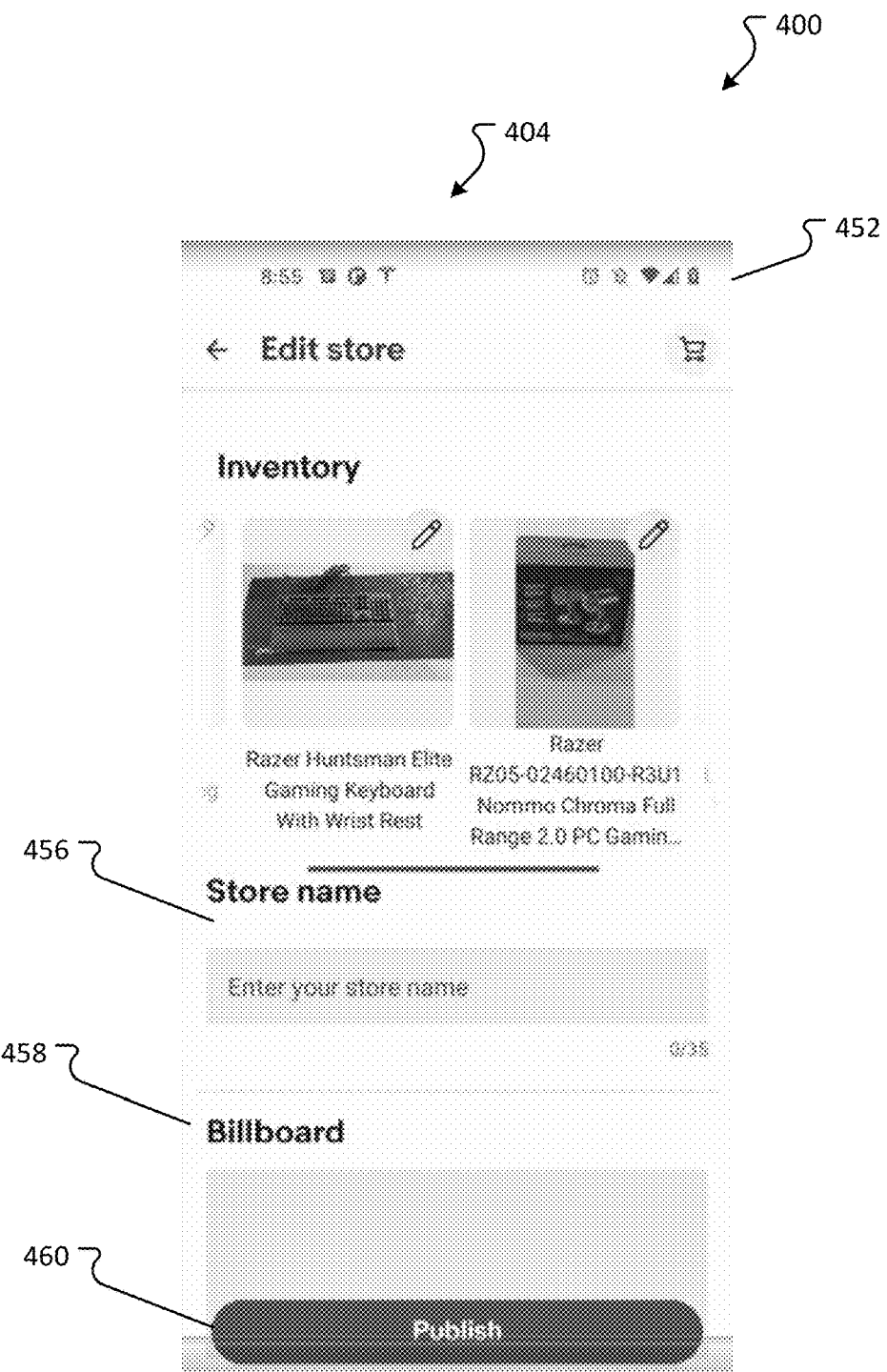
Figure 4C:
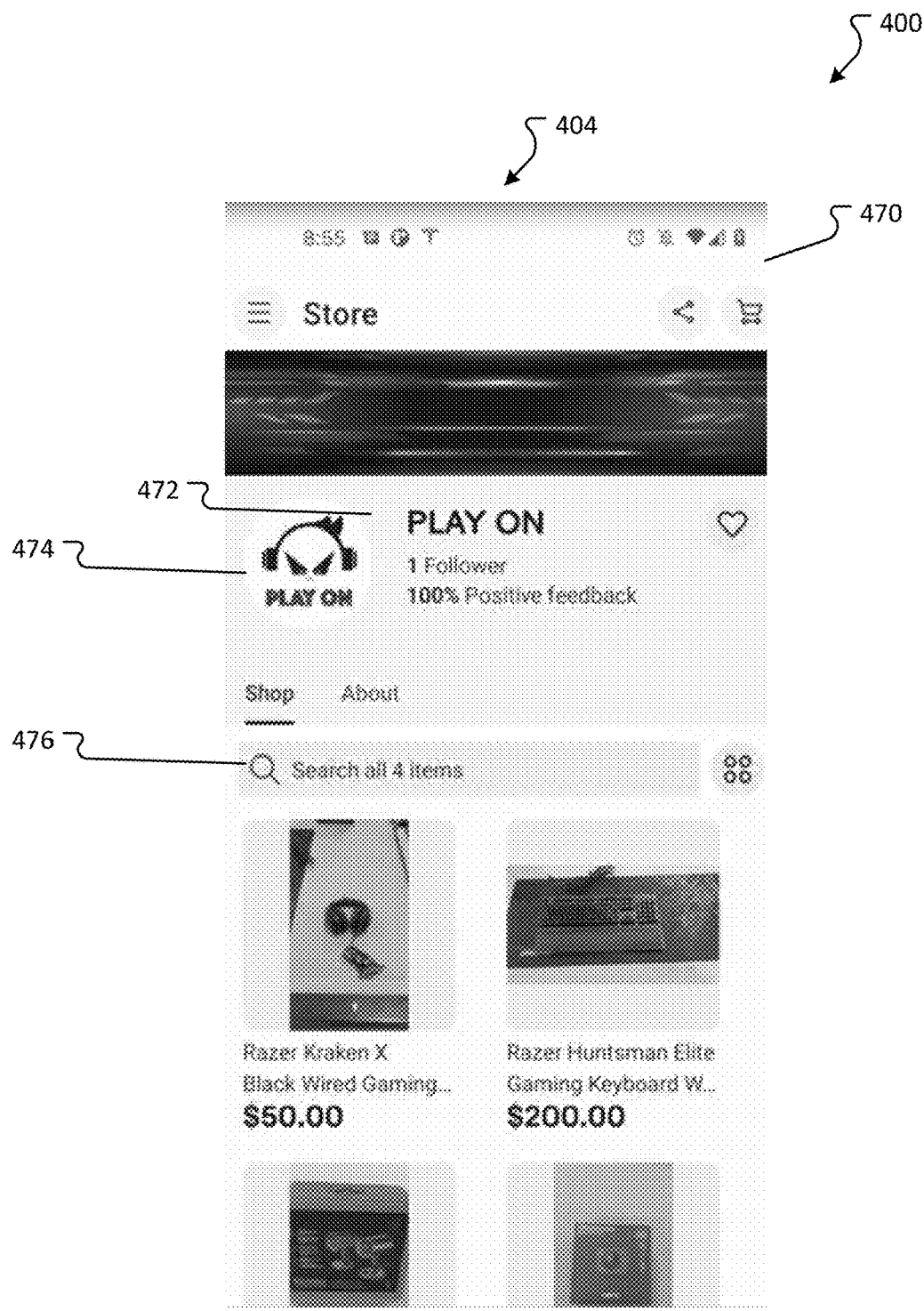

FIGS. 4A-C depict example features that may be provided by an electronic marketplace application to assist a user in creating listings for items that the user may wish to list for sale in an electronic marketplace, in accordance with aspects of the present disclosure.

Figure 5:
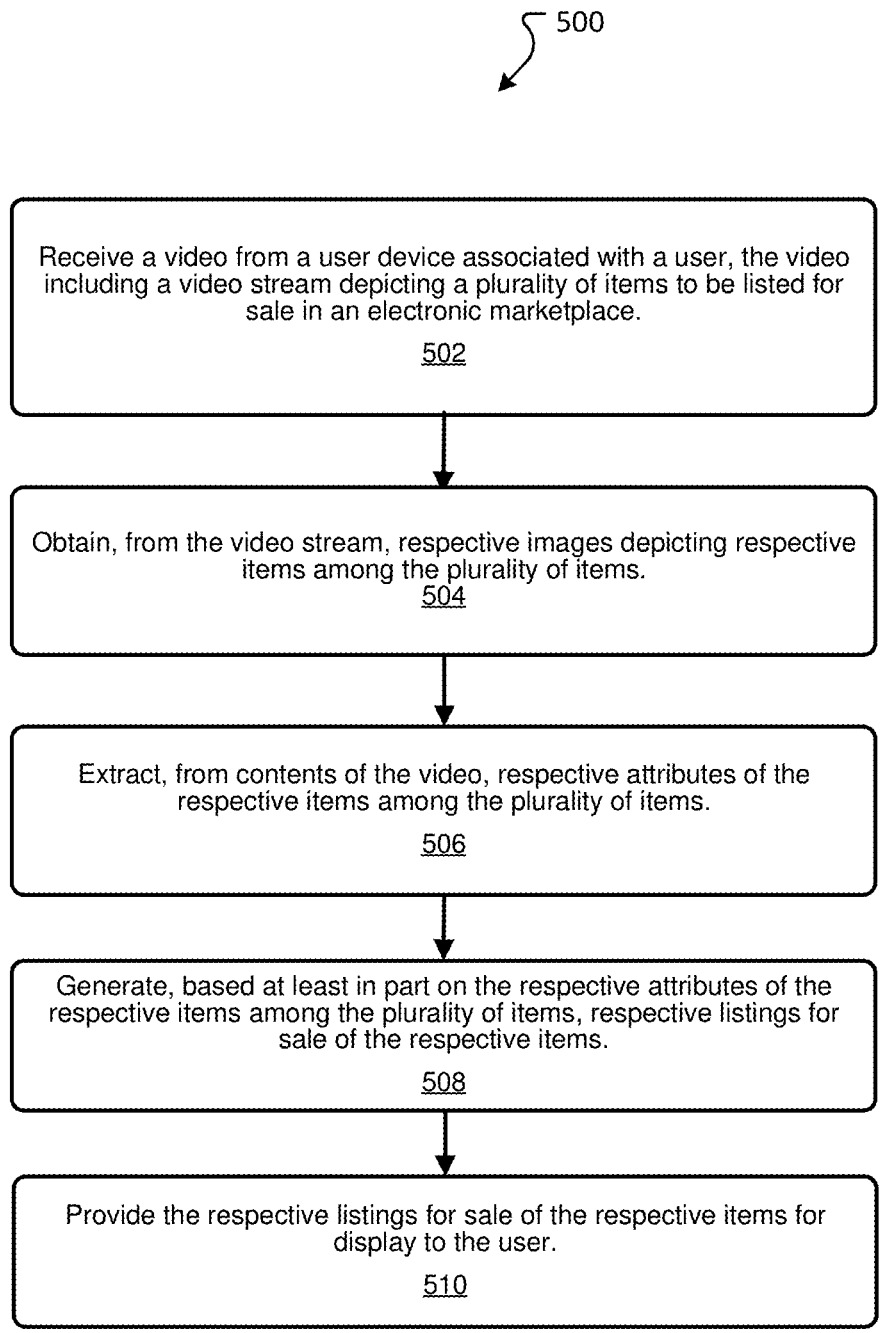

FIG. 5 depicts an example user an electronic marketplace store generated for a user, in accordance with aspects of the present disclosure.

Figure 6:
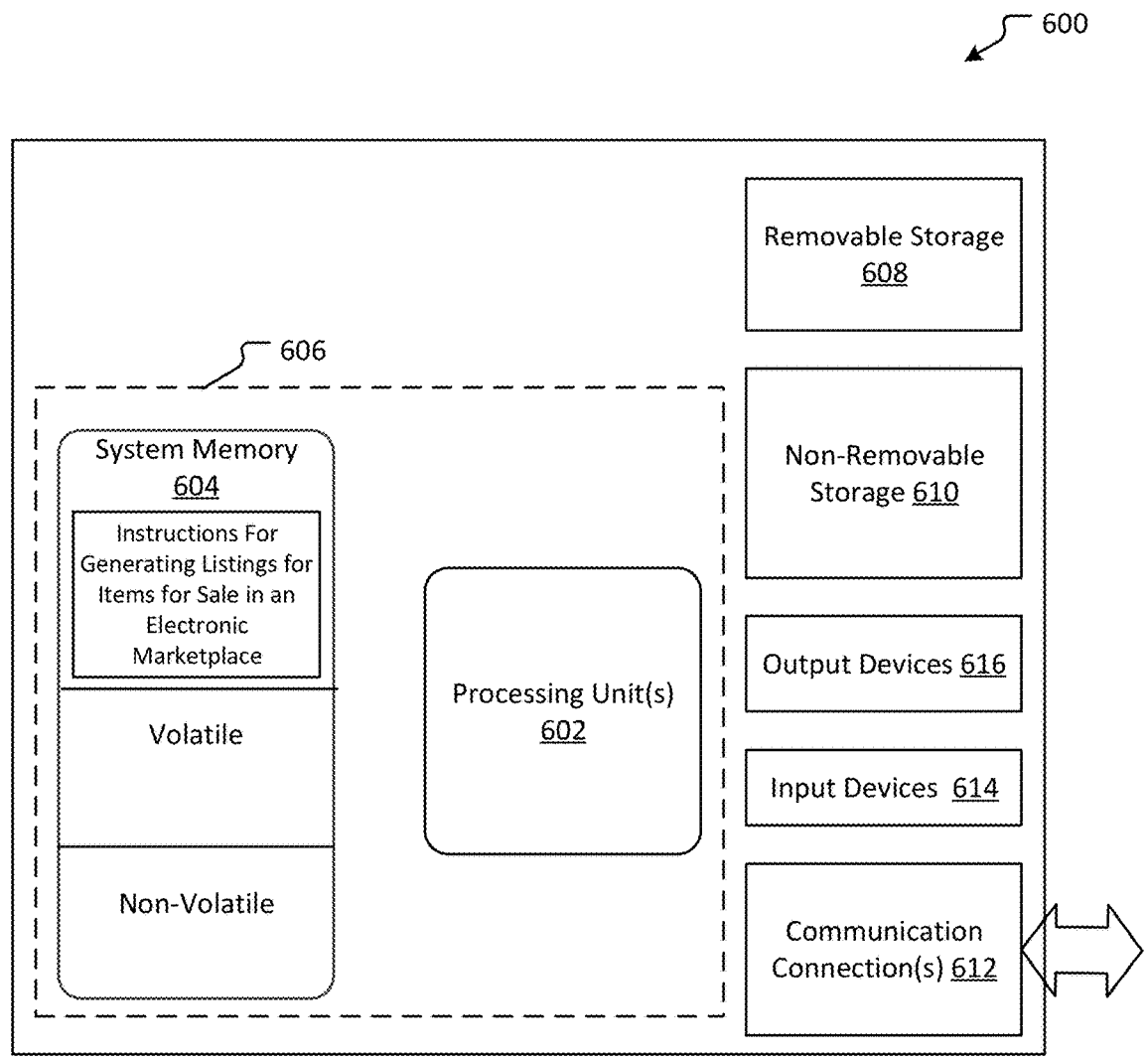

FIG. 6 is a block diagram illustrating example physical components of a computing device with which aspects of the disclosure may be practiced.

DETAILED DESCRIPTION

Various aspects of the disclosure are described more fully below with reference to the accompanying drawings, which from a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Aspects may be practiced as methods, systems, or devices. Accordingly, aspects may take the form of a hardware implementation, an entirely software implementation or an implementation combining software and hardware aspects. The following detailed description is, therefore, not to be taken in a limiting sense.

Aspects of the present disclosure relate to systems and methods for creating multiple listings for sale in an electronic marketplace. In an aspect, a listing application may receive a video from a user device, such as a mobile phone equipped with a camera, the video including depictions and, in some cases, audio descriptions of items that the user wishes to list for sale in the electronic marketplace. The listing application may identify, based on the content of the video, various items that the user wishes to sell, obtain images (e.g., screen shots) of the items, extract attributes of the items, etc. For example, the listing application may utilize one or more trained machine learning (ML) models to process the video, convert the audio description of the items in the video to a text output including textual descriptions of the items, determine locations (e.g., timestamps) of where the items are depicted in the video, process the textual descriptions to recognize named entities and other item attributes mentioned in the video, etc. The listing application may then generate respective listings for the multiple items in the video based on the information gleaned from the video, such as images depicting the items, attributes of the items, etc. In some aspects, the listing application may search a products catalog to find similar items listed in the electronic marketplace. The listing application may obtain additional item attributes based on the similar items listed in the electronic marketplace, and may include the additional attributes in the listings generated for the items in the video. Additionally or alternatively, the listing application may determine, based on trending prices of the similar items listed in the electronic marketplace, prices that the listing application may suggest to the user for the items in the video. The generated listings may then be displayed to the user for editing and/or final approval by the user. The listing application may also generate an electronic marketplace store for the user and may list the items in the electronic marketplace store. The electronic marketplace store may include a digital storefront, a title, a logo, a billboard, etc. that may enhance the user's ability to sell the items in the electronic marketplace. In these ways, the user may easily and efficiently list an inventory of multiple items in the electronic marketplace by simply recording a video depicting and describing the multiple items that the user wishes sell in the electronic marketplace.

Figure 1:
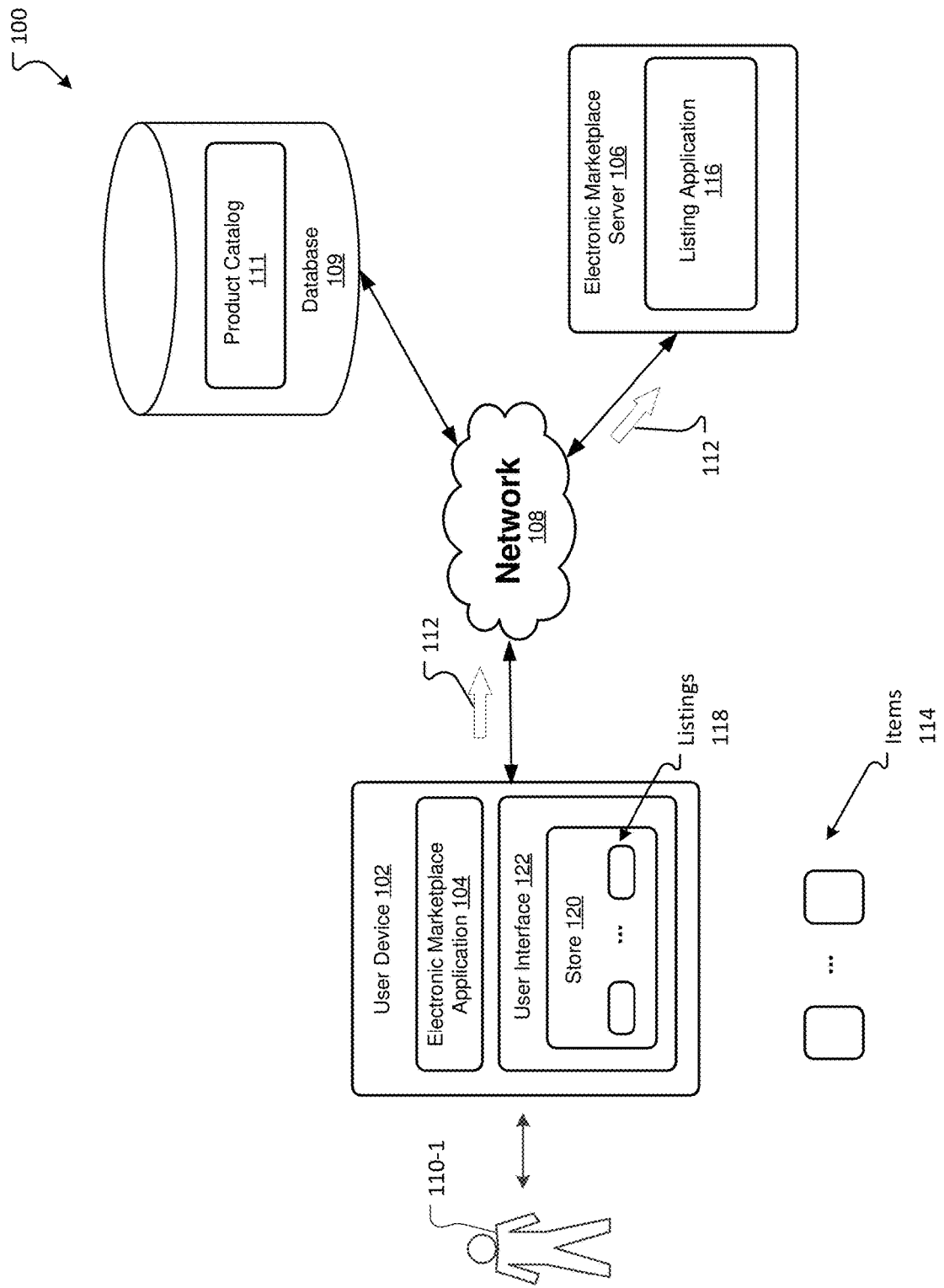
FIG. 1 illustrates an exemplary system for creating listings for sale in an electronic marketplace based on identifying items in a video feed, in accordance with aspects of the present disclosure.

FIG. 1 illustrates an exemplary system 100 for creating listings for sale in an electronic marketplace, in accordance with aspects of the present disclosure. The system 100 may include a user device 102 that may be configured to run or otherwise execute a client application 104. The user device 102 may be a mobile device, such as a smartphone, equipped with a camera. Although a single user device 102 is illustrated in FIG. 1, the system 100 may generally include multiple user devices 102 configured to run or otherwise execute client applications 104. The user devices 102 may include, but are not limited to, laptops, tablets, smartphones, and the like. The applications 104 may include applications that allow users to engage with an electronic marketplace (sometimes referred to herein as "electronic marketplace applications"), for example to allow users to sell items and/or to buy items in the electronic marketplace. In some examples, the client applications 104 may include web applications, where such client applications 104 may run or otherwise execute instructions within web browsers. In some examples, the client applications 104 may additionally or alternatively include native client applications residing on the user devices 102. The one or more user devices 102 may be communicatively coupled to an electronic marketplace server 106 via a network 108. The network 108 may be a wide area network (WAN) such as the Internet, a local area network (LAN), or any other suitable type of network. The network 108 may be single network or may be made up of multiple different networks, in some examples.

The system 100 may include a database 109. The database 109 may be communicatively coupled to the electronic marketplace server 106 and/or to the user device 102 via the communication network 108, as illustrated in FIG. 1, or may be coupled to the electronic marketplace server 106 and/or to the user device 102 in other suitable manners. For example, the product database 109 may be directly connected to the electronic marketplace server 106, or may be included as part of the meeting electronic marketplace server 106, in some examples. The database 109 may be a single database or may include multiple different databases. The database 109 may store one or more product catalogues 111 that may include information about various items that may be listed for sale in the electronic marketplace, such as description of the items, prices of the items, etc.

In aspects, the client application 104 running or otherwise executing on the user device 102 may be configured to assist a user 110 of the user device 102 in generating listings for items that the user 110 may wish to sell in the electronic marketplace. In an aspect, the client application 104 may allow the user 110 to record a video 112 depicting multiple items 114 that the user 110 wishes to sell in the electronic marketplace, and to upload the video to the electronic marketplace application server 106. In an example, the user 110 may own or otherwise operate a physical store, for example, and the items 114 may include inventory of the physical store that the user 110 may wish to list for sale in the electronic marketplace. In aspects, the user 110 may wish to convert the physical store to an electronic store in the electronic marketplace. As another example, the items 114 may include personal items that the user 110 may wish to list for sale in the electronic marketplace. The items 114 may thus include items in a same category (e.g., electronics, shoes, etc.) or may include items in different categories. The items 114 may include new items (e.g., items in unopened boxes, etc.) and/or may include used items in varying conditions.

In an aspect, the user 110 may record the video 112 using a camera with which the user device 102 may be equipped or otherwise associated. For example, the client application 104 may prompt the user 110 to create listings for items by recording a video using the camera of the user device 102. The client application 104 may then access the camera of the user device 102 and may allow the user 110 to record the video 112 from within the client application 104. In other aspects, the video 112 may be recorded in other suitable manners and/or using other suitable recording devices. In an aspect, the video 112 may include a video stream depicting respective ones of the multiple items 114 and an audio stream including descriptions of the respective ones of the multiple items 114. The user 110 may record the video 112, for example, by taking a sweep of the items 114 with the camera, stopping to describe each item 114 while the camera is hovering over the item 114. While describing each item 114, the user 110 may provide various details describing the item 114, such as type, brand, model, color, size, condition (e.g., new, in a box, used, good condition, etc.), etc. of the item 114. The user 110 may then move the camera to the next item 114, and, while the camera is hovering over the next item 114, the user 110 may provide details describing the next item 114, and so on. In some aspects, the user 110 may provide audio cues for transitioning between items 114, for example by saying "the next item is . . . " of the like prior to, or in the process of, moving the camera to the next item 114.

The user device 102 may transmit the video 112 via the network 108 to the electronic marketplace server 106. The electronic marketplace application server 106 may receive the video 112 and may provide the video 112 to a listing application 116 that may be running or otherwise executing on the electronic marketplace server 106. The listing application 116 may process a video stream of the video 112 to identify items 114 depicted in the video 112 and extract respective attributes of the items 114 from the content of the video 112. For example, as described in more detail below, the listing application 116 may convert the audio stream of the video 112 to a text output, recognize named entities and descriptions in the text output, identify and process video frames that depict the items 114 in the video 112, etc. Based on the information gleaned from the video 112, the listing application 116 may generate respective listings 118 for respective ones of the items 114. For example, the In an aspect, to generate a listing 118 for an item 114, the listing application 116 may search one or more product catalogs 111 stored in the database 109 to find one or more similar items that may be listed for sale in the electronic marketplace. In an aspect, the listing application 116 may generate, based on information gleaned from the video 112, a representation (e.g., a vector representation) of the item 114, and may utilize the representation of the item 114 to query the one or more product catalogs 111 on the database 109. The listing application 116 may utilize information (e.g., attributes, descriptions, etc.) from one or more matching product entries obtained from the product catalogs 111 to populate fields of the listing 118 for the item 114. In some aspects, the listing application 116 may determine, based on a price in the one or more matching product entries, a trending price for the item 114 in the electronic marketplace. In an aspect, the application 116 may suggest the trending price as the price for the item 114. For example, the listing application 116 may include the trending price in the listing 118 generated for the item 118 as a suggestion of the price for the item 114.

In some aspects, the listing application 116 is further configured to generate an electronic store 120 for the user and to associate the listings 114 with the electronic store 120 generated for the user. The listing application 116 may generate the electronic storefront based on the items 114 (e.g., based on the type of items 114, etc.) and/or based on additional information that may be provided by the user 110 via the client application 104, for example. The electronic storefront may include a store title, a store logo, a particular color scheme, etc. The items 114 may then be displayed to potential buyers within the electronic storefront generated for the user 110. The user 110 may thus be able to quickly and efficiently list the multiple items 114 that the user wishes to sell in the electronic marketplace, such as inventory of a physical store that the user 110 may wish to sell in the electronic marketplace.

The listings 118, and in some aspects the store 120, generated by the listing application 116 may be displayed to the user 110 in a user interface 122 of the client application 104. The user 110 may view the listings 114 and/or the store 120, edit the listings 114 and/or the store 120 if needed or desired, and approve the listings 114 and/or the store 120 for publishing in the electronic marketplace. The listings 114 and/or the store 120 may then be published in the electronic marketplace and may be accessed by potential buyers in the electronic marketplace. The user 110 may thus easily and efficiently list an inventory of multiple items 114 in the electronic marketplace by simply recording a video depicting and describing the items 114 that the user wishes sell in the electronic marketplace.

Referring still to FIG. 1, while the listing application 116 is illustrated in FIG. 1 as being executed by the electronic marketplace server 106, the listing generator engine 123 and/or the listing application 125 may be at least partially executed at the client application 104 running on the user device 102. For example, the listing application 116 may be operative at the user device 102 to generate the listings 118 based on the video 112. Moreover, the listing application 116 may at least partially reside at the client application 104.

Figure 2:
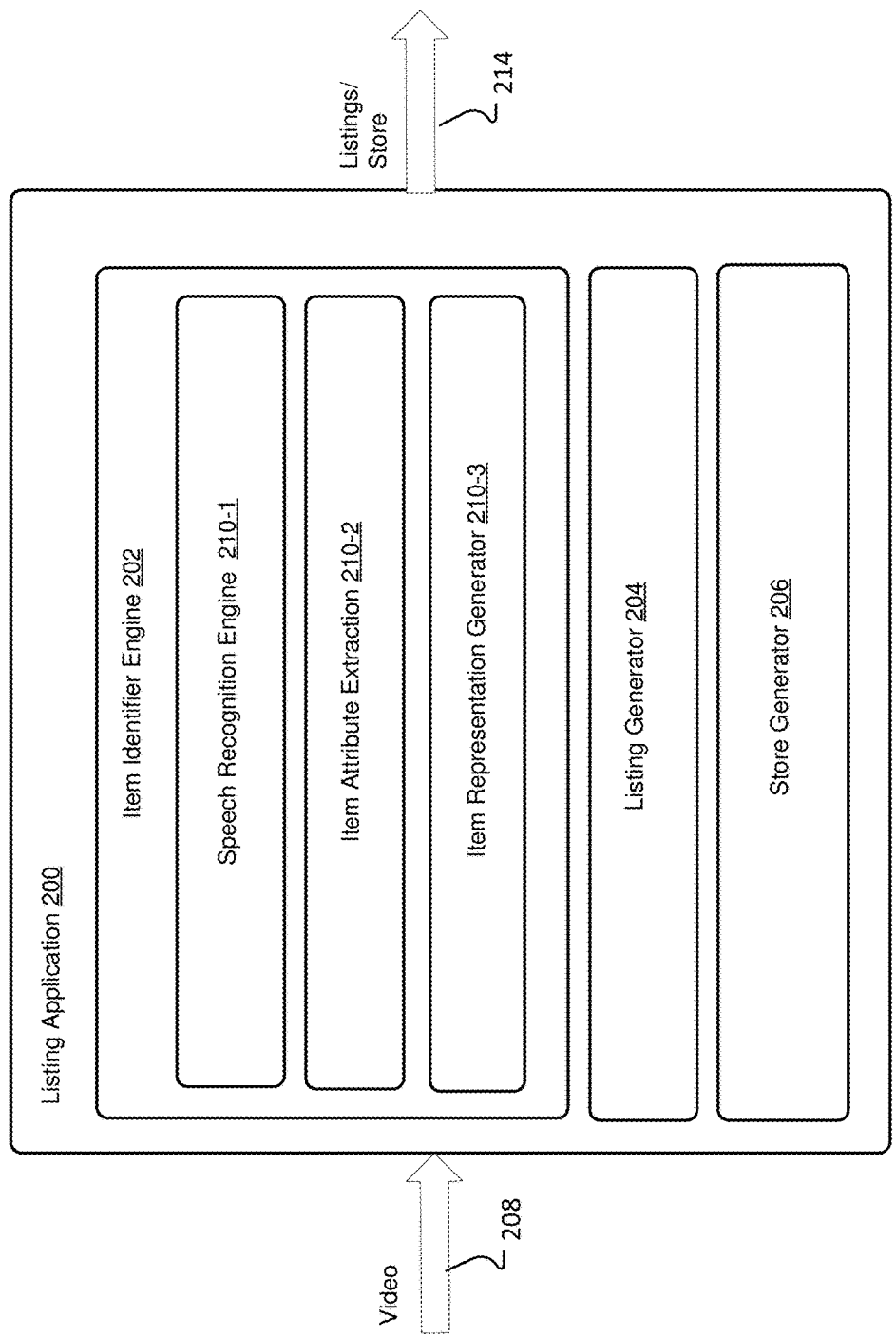
FIG. 2 depicts an example listing generator engine, in accordance with aspects of the present disclosure.

FIG. 2 depicts an example of a listing application 200, in accordance with aspects of the present disclosure. In an example, the listing application 200 corresponds to the listing application 116 of FIG. 1. For ease of explanation, the listing application 200 is described with reference to FIG. 1. In another example, the listing application 200 may be utilized in a system different from the system 100 of FIG. 1.

The listing application 200 may include an item identifier engine 202 and a listing generator 204. In some aspects, the listing application 200 may additionally include a store generator 206. In other aspects, the listing application 200 may omit the store generator 206. The listing application 200 may receive a video 208, and may provide the video 206 to the item identifier engine 202. The video 208 may correspond to the video 112 of FIG. 1 and may include a video stream depicting multiple items that the user wishes to sell in the electronic marketplace, such as the items 114 of FIG. 1. The video 208 may additionally include an audio stream including descriptions of the multiple items 114. The item identifier engine 202 may process the video 208 using one or more processing engines 210 to identify the items 114 in the video stream of the video 208 and to create representations of the items 114 identified in the video stream of the video 208. The processing engines 210 may include processing engines that may be implemented as parts of the item identifier engine 202 and/or may include services that may be external to the item identifier engine 202 and may be accessible by the item identifier engine 202 via the network 108, for example. The processing engines 210 may include general purpose engines, such as general-purpose services and/or may include customized engines, such as engines specifically designed for electronic marketplace applications.

The processing engines 210 may include a speech recognition engine 210-1, an item attribute extraction engine 210-2 and an item representation generator 210-3. The speech recognition engine 210-1 may employ one or more speech recognition models (e.g., trained machine learning models) to convert the audio stream of the video 208 to a text output. The one or more speech recognition models may include a general speech recognition model and one or more industry-specific speech recognition modules. The one or more industry-specific speech recognition models may include an electronic commerce aware language model trained to recognize electronic marketplace specific terms, words, expressions, etc., for example. In some aspects, the speech recognition models may include one or more product category language models, such as electronics category language model, shoes category language model, etc. Such product category language models may be configured to boost speech recognition of hot words, terms, expressions, etc. in the corresponding product category. In some aspects, the item identifier engine 202 may be configured to select one or more appropriate product category model, based for example based on prior knowledge of categories of the items 114 and/or based on identifying the categories of the items 114 from the content of the video 208, and to utilize the selected one or more product category models to boost appropriate words, terms, expressions, etc. when converting speech to text in the video 208.

The item identifier engine 202 may be configured to identify locations (e.g., timestamps corresponding to the locations) within the video 208 at which respective items 114 are depicted and/or described in the video 208. For example, the item identifier engine 202 may identify timestamps corresponding to locations within the video 208 at which particular items are being described by the user. In some aspects, the item identifier engine 202 may identify the locations additionally or alternatively based on audio cues (e.g., transition cues), for example based on detecting phrases such as "next I have . . . ," "my next item is . . . ," etc. Additionally or alternatively, the item identifier engine 202 may identify the locations the using motion detection, for example to detect locations at which the user is hovering over the items in the video 208.

The text output generated by the speech recognition engine 210-1, along with identifies of locations at which the items are depicted and/or described in the video 208 may be provided to the attribute extraction engine 210-2. The attribute extraction engine 210-2 may comprise a named entity recognition model trained to recognize item attributes based on textual descriptions of items that may be depicted in the video 208, for example. The attribute extraction engine 210-2 may process the text output from the speech recognition engine 210-1 to extract item attributes from the content of the video 208. Item attributes extracted from the content of the video 208 for a particular item 114 may include a brand of the item 114, a model of the item 114, a size of the item 114, condition of the item 114, etc.

The item attributes extracted by the attribute extraction engine 210-2 may be provided to the item representation generator 210-3. Additionally, the item identifier engine 202 may extract images (e.g., video frames or screen shots) depicting the items 114 from the vide 208, and may provide the images as inputs to the item representation generator 210-3. The item representation generator 210-3 may be configured to generate a single representation of an item that may be, for example, in a form of a vector representing the item. For example, the item representation generator 210-3 may comprise a machine learning model trained to generate an item representation (e.g., a vector) for an item from various modalities (e.g., images, textual descriptions, etc.) corresponding to the item. The item representation generator 210-3 may thus generate respective representations for the multiple items 114 based on the information (images, attributes, etc.) that may be gleaned from the content of the video 208.

In an aspect, the item identifier engine 202 may utilize the item representations generated by the item representation generator 210-3 as queries to search a products catalogue to find products closely matching the items 114. Information from an entry in the products catalog matching an item 114 may then be provided to the listing generator 204 and may be utilized by the listing generator 204 to populate fields of a listing that the listing generator 206 may generate for the item 114. Additionally or alternatively, information (e.g., images, item attributes, etc.) gleaned from the video 208 may be provided to the listing generator 204 and may be utilized for generating listings by the listing generator 204. For example, the listing generator 204 may generate a listing for an item 114 to include an image extracted from the video 208 depicting the item 114. In some aspects, the listing generator 204 may use one or more attributes (e.g., brand, model, color, size, etc.) extracted from the content of the video 208 for an item 114 to directly populate corresponding fields in a listing generated for the item 114.

With continued reference to FIG. 2, in some aspects, the store generator 206 may generate an electronic store for the user, and may include the listings generated by the listing generator 204 in the electronic store generated for the user. The store generator 206 may generate an electronic storefront for the electronic store based on the items 114 (e.g., based on the type of items 114, etc.) and/or based on additional information that may be provided by the user 110 via the application 104, for example. The electronic storefront may include a store title, a store logo, a particular color scheme, etc. In an aspect, the listing application 200 may generate a listing output 214 that may include the multiple listings generated by the listing generator 204 and/or the electronic store generated by the store generator 206, and may provide the output 114 to the client application 104 for display to the user 110 in the user interface 122 of the client application 104.

Figure 3:
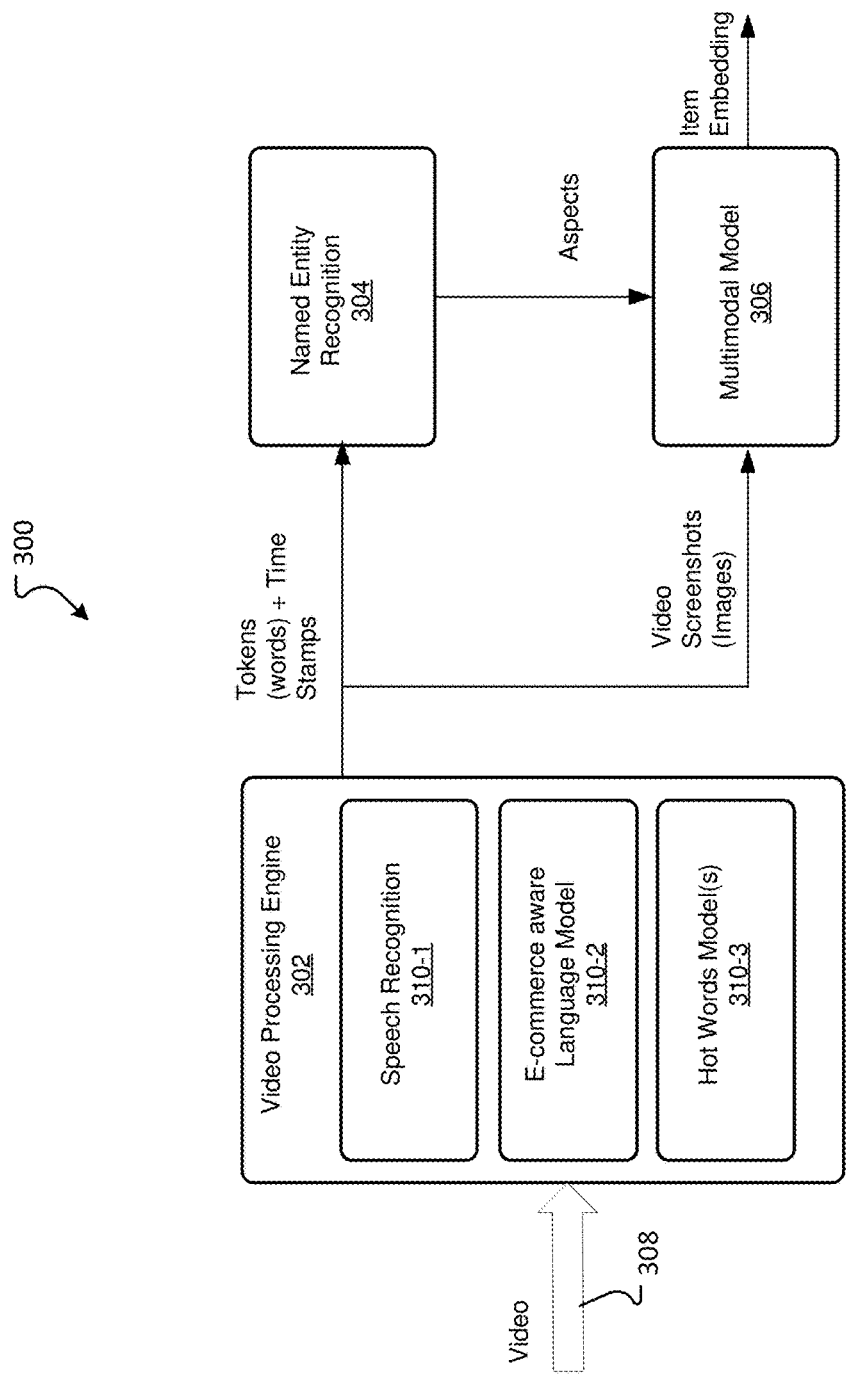
FIG. 3 depicts an example video processing system, in accordance with aspects of the present disclosure.

FIG. 3 depicts an example item identifier engine 300, in accordance with aspects of the present disclosure. The item identifier engine 300 corresponds to the item identifier engine 202 of FIG. 2. For ease of explanation, the item identifier engine 300 is described with reference to FIG. 2. In another example, the item identifier engine 300 may be utilized with an application different from the listing application 200 of FIG. 2.

The item identifier engine 300 may include a video processing engine 302, a named entity recognition engine 304 and a multimodal model 306. The video processing engine 302 may be configured to process a video 308 (e.g., corresponding to the video 208 of FIG. 2) that may include a video stream depicting multiple items (e.g., items 114) that a user wishes to list for sale in the electronic marketplace. In some aspects, the video 308 may also include an audio stream providing description of the multiple items in the video 308. The video processing engine 302 may use one or more of a general speech recognition model 310-1, an electronic commerce aware language model 310-2 and one or more product category models 310-3 to convert at least a portion of the audio stream of the video 308 to a text output containing words or "tokens" that may be recognized in the audio stream describing the multiple items in the video 308. The general speech recognition model 310-1 may be a general-purpose automatic speech recognition (ASR) engine or service. The electronic commerce aware language model 310-2 may be a model (e.g., an ML model such as a neural network) trained to recognize electronic marketplace specific terms, words, expressions, etc., for example. The one or more product category language models 310-3 may include category models such as electronics category language model, shoes category language model, etc., configured to boost speech recognition of hot words, terms, expressions, etc. in the corresponding product category. As an example, a product category language model 310-3 for the electronics category may boost brand names such as Razor, iPhone, etc. to enhance ability of the video processing engine 302 to distinguish between the brand names and similar-sounding words such as razer and phone. In some aspects, the video processing engine 302 may be configured to select one or more appropriate product category models 310-3, based for example based on prior knowledge of categories of the items 114 and/or based on identifying the categories of the items 114 from the content of the video 308, and to utilize the selected one or more product category models to boost appropriate words, terms, expressions, etc. when converting speech to text in the video 308.

In some aspects, the video processing engine 302 may be configured to identify, based on the content of the video 308, locations at which the respective items 114 are depicted and/or described in the video 308. For example, the video processing engine 302 may determine a location at which an item is depicted in the video 308 using motion detection to detect a location at which a camera was hovering over an item. Additionally or alternatively, the video processing engine 302 may determine a location at which an item is depicted in the video 302 based on audio cues, such as based on detecting transitional phrases such as "my first item is . . . ," "my next item is . . . ," in the audio stream of the video 308. In an aspect, the video processing engine 302 may generate timestamps or other suitable indicators to indicate locations at which the respective items 114 are depicted and/or described in the video 308. In some aspects, the video processing engine 302 may extract, from the video 308, respective images (e.g., screen shots) that depict the respective items 114. The video processing engine 302 may obtain an image for an item by taking a screen shot at a location, in the video 308, corresponding to the timestamp identified for the item 114. In an aspect, the video processing engine 302 may be configured to identify one or more best images depicting an item 114, for example by aligning images with the text output including a description of the item. In some embodiments, video processing engine 302 may split the video 308 into multiple videos depicting respective items 114, for example based on motion detection and/or transition phrase detection in the video 308. The multiple videos may then be processed in parallel by the item identifier 300 to expedite creation of listings for the multiple items 114.

The output of the text output generated by the video processing engine 302 and the indicators (e.g., timestamps) indicating locations that depict and/or describe the respective items 114 in the video 308 may be provided to the named entity recognition engine 304. The named entity recognition engine 304 may be configured to extract attributes of the items 114 from the text output generated by the video processing engine 302. In some aspects, the named entity recognition engine 308 may comprise a multilingual model configured to recognize a language (e.g., English, Spanish, etc.) of the text output generated by the video processing engine 302, and extract attributes of the items 114 in the corresponding language. In an aspect, the attributes extracted from the text output generated by the video processing engine 302 may comprise values corresponding to respective attribute categories, such as brand, model, type, color, size, condition, electrical feature (e.g., connectivity type), etc. In an aspect, the named entity recognition engine 304 may analyze a portion of the text output corresponding to a particular item 114 to generate attribute pairs, each attribute pair including an attribute category and an attribute value extracted from the text output generated by the video processing engine 302. As just an example, attribute pairs may include pairs such as [Brand:Razar], [ProductID: Chroma], [Type:Headset], [Connectivity:USB], [Color: Red], and so on.

The attributes of an item 114 extracted by the named entity recognition engine 304 may be provided as a modality descriptive of the item 114 to the multimodal model 306. One or more additional modalities descriptive of the item 114 may also be provided to the multimodal model 306. For example, the one or more images depicting the item 114 obtained from the video 308 may be provided as an additional modality descriptive of the item 114 to the multimodal model 306. The multimodal model 306 may generate a representation of the item 114 based on the multiple modalities descriptive of the item 114. In an aspect, the multimodal model 306 may comprise a trained ML multimodal model, such as vision-text Bidirectional Encoder Representations from Transformer (VT-BERT) model. In other aspects, the multimodal model 306 may be implemented in other suitable manners. In an aspect, the multimodal model 306 may generate the item representations for the items 114 in the form of item embeddings, or vectors representing the items 114. The item representations generated by the multimodal model 306 may be utilized to search a product catalog to find similar items for generating listings for the items 114 as described above. In some aspects, the item representations generated by the multimodal model 306 may be stored in association with the listings generated for the items 114 so that the listings may subsequently searched based on queries that may be provided by potential buyers, for example.

FIGS. 4A-C depict example features that may be provided by an electronic marketplace application 400 to assist a user in creating listings for items that the user may wish to list for sale in an electronic marketplace. In an aspect, the electronic marketplace application 400 may correspond to the electronic marketplace application 104 of the system 100 of FIG. 1. For ease of explanation, the electronic marketplace application 400 is described with reference to FIG. 1. In another example, the electronic marketplace application 400 may be utilized with a system different from the system 100 of FIG. 1.

Referring first to FIG. 4A, an example user interface prompt 402 may be displayed in a user interface 404 of the electronic marketplace application 400 to prompt the user to initiate creation of an electronic store, in accordance with aspects of the present disclosure. The user interface 404 may correspond to the user interface 116 of FIG. 1. The user interface prompt 402 may be displayed in a profile screen 406 in the user interface 404 when the user is logged into the electronic marketplace application 400. The profile screen 406 may display a username 408 and a logo 410 associated with the user logged into the electronic marketplace application 400. The username 408 may correspond to a business name associated with a business of the user, such as a physical store owned or otherwise operated by the user. The logo 410 may be, for example, a logo of the physical store owned or otherwise operated by the user. In some aspects, the username 408 and/or the logo 410 may not be associated with a physical store. In aspects, the username 408 and/or the logo 410 may be stored in a database in association with a user account of the user, and may be retrieved from the database for display in the profile screen 406.

The user interface prompt 402 may comprise a clickable button or icon, for example. The user may click on, or otherwise engage with, the user interface prompt 402 to initiate creation of an electronic store. In response to detecting that the user has engaged with the user interface prompt 402, the electronic marketplace application 400 may access a camera on the user device 102 (e.g., a mobile phone), and may allow the user to record a video (e.g., the video 112) depicting and describing multiple items (e.g., the items 114) that the user wishes to include as inventory in the electronic store. The electronic marketplace application 400 may transmit the video recorded by the user to the electronic marketplace server 106 for generation of listings for the multiple items and, in some cases, a storefront for the electronic store, by the listing application 116.

Referring now to FIG. 4B, an edit store screen 452 may display listings 454 generated for the user based on the video recorded by the user to allow the user to view and, if necessary and/or desired, edit details of the listings. The edit store screen 452 may additionally display one or more fields for entering or editing details of an electronic store generated for the user. For example, the edit store screen 452 may include a title field 456 that may allow the user to enter a name or a title for the electronic store. In another aspect, the title field 456 may include a title or name that may be generated by the listing application 116 for the electronic store, for example based on the content of the video recorded by the user, and may allow the user to edit the generated name or title for the electronic store. In an aspect, the edit store screen 452 may display a billboard field 456 that may allow the user to upload a billboard image or a logo for the electronic store. In other aspects, the edit store screen 452 may additionally or alternatively display other suitable fields for prompting the user to provide and/or edit details for the electronic store. The edit store screen 452 may additionally display a publish icon or button 460 for publishing the electronic store. The user may click on or otherwise engage with the publish icon or button 460 to approve and publish the electronic store in the electronic marketplace.

Turning now briefly to FIG. 4C, a store screen 470 may display an electronic store generated for the user. The store screen 470 may include a title field 472 displaying the name or title generated for and/or entered or edited by the user via the edit store screen 452. The store screen 470 may also include a logo field 474 displaying a logo for the electronic store that may have been provided by the user (e.g., via the edit store screen 452) or otherwise generated for the electronic store associated with the user. The store screen 470 may additionally provide a display of the listings for the items that were depicted in the video recorded by the user. In some aspects, the store screen 470 may display a search field 476 to allow potential byers to search for products in the electronic store.

FIG. 5 illustrates an exemplary method 500 for generating listings for items for sale in an electronic marketplace, in accordance with aspects of the present disclosure. In one example, the method 500 may be performed by a server device to generate respective listings for multiple items based on a video received from a user device. A general order of the operations for the method 500 is shown in FIG. 5. The method 500 may include more or fewer steps or may arrange the order of the steps differently than those shown in FIG. 5. The method 500 can be executed as a set of computer-executable instructions executed by a computer system and encoded or stored on a computer readable medium. Further, the method 500 can be performed by gates or circuits associated with a processor, an ASIC, an FPGA, a SOC or other hardware device. Hereinafter, the method 500 shall be explained with reference to the systems, components, devices, modules, software, data structures, data characteristic representations, signaling diagrams, methods, etc., described in conjunction with FIGS. 1, 2, 3, 4A-C, and 6.

Method 500 begins at operation 502 at which a video is received from a user device. The video may include a video stream depicting a plurality of items to be listed for sale in the electronic marketplace. For example, the video 112 including a video stream depicting the items 114 is received. In another aspect, another suitable video is received depicting suitable items different from the items 114 is received. The video may having been recorded by the user using a camera od the user device, such as a mobile phone, for example. The user may have recorded the video by taking a sweep (e.g., a 360 degree sweep) of an inventory of a physical store that is operated by the user, for example.

At block 504, respective images depicting respective items among the plurality of items are obtained from the video stream of the video. In an aspect, the respective images are obtained based on determining locations (e.g., timestamps) corresponding to video frames, in the video stream, in which the items are depicted. In an aspect, the locations are determined based on the audio stream, for example by determining locations in the video at which the items are being described by the user. Additionally or alternatively, the locations are determined based on motion detection, detecting that the user is hovering over the item in the video. In other aspects, other suitable factors are additionally or alternatively utilized to determine locations at which the items are depicted in the video.

At block 506, respective attributes of the respective items among the plurality of items are extracted from content of the video. In an aspect, the attributes are extracted from descriptions of the items in the video. For example, at least a portion of the audio stream of the video may be converted to a text output containing textual descriptions of the respective items, and the attributes of the items may be extracted from the textual descriptions of the respective items. In an aspect, portions of the textual descriptions corresponding to respective items may be analyzed by a named entity recognition model to extract attributes of the corresponding items. In other aspects, the attributes of the respective items may be extracted from content of the video in other suitable manners.

At block 508, respective listings for sale of the respective items are generated. The respective listings are generated based at least in part on the respective attributes of the respective items extracted from the content of the video. In an aspect, a listing for a particular item is generated to include the attributes of the particular item that are extracted at block 506. The listing may further include an image of the particular item obtained at block 504. In some aspects, a products catalog may be searched to find one or more similar items listed in the electronic marketplace, and the listing may be generated based on attributes that may be associated with the similar items in the electronic marketplace. In an aspect, a representation (e.g., a vector representation) of a particular item may be generated (e.g., using a trained multimodal model) based on multiple modalities descriptive of the particular item, such as one or more images of the particular item obtained from the video, the attributes of the item extracted from content of the video, etc., and the representation of the particular item may be utilized to search the product catalog to find one or more similar items. In other aspects, other suitable techniques may utilized to generate the listings for the respective items.

At block 510, the respective listings for sale of the respective items are provided for display to the user. For example, the respective listings may be transmitted to the user device ad may be displayed to the user via a user interface of a marketplace application that may be running or otherwise executing on the user device. The user may then edit the listings as needed and may approve the listings for publishing in the electronic marketplace. The user may thus easily and efficiently list an inventory of multiple items in the electronic marketplace by simply recording a video depicting and describing the items that the user wishes sell in the electronic marketplace.

FIG. 6 illustrates a simplified block diagram of the device with which aspects of the present disclosure may be practiced in accordance with aspects of the present disclosure. One or more of the present aspects may be implemented in an operating environment 600. This is only one example of a suitable operating environment and is not intended to suggest any limitation as to the scope of use or functionality. Other well-known computing systems, environments, and/or configurations that may be suitable for use include, but are not limited to, personal computers, server computers, handheld or laptop devices, multiprocessor systems, microprocessor-based systems, programmable consumer electronics such as smartphones, network PCs, minicomputers, mainframe computers, distributed computing environments that include any of the above systems or devices, and the like.

In its most basic configuration, the operating environment 600 typically includes at least one processing unit 602 and memory 604. Depending on the exact configuration and type of computing device, memory 604 (instructions to perform customization of applications as described herein) may be volatile (such as RAM), non-volatile (such as ROM, flash memory, etc.), or some combination of the two. This most basic configuration is illustrated in FIG. 6 by dashed line 606. Further, the operating environment 600 may also include storage devices (removable, 608, and/or non-removable, 610) including, but not limited to, magnetic or optical disks or tape. Similarly, the operating environment 600 may also have input device(s) 614 such as keyboard, mouse, pen, voice input, on-board sensors, etc. and/or output device(s) 616 such as a display, speakers, printer, motors, etc. Also included in the environment may be one or more communication connections, 612, such as LAN, WAN, a near-field communications network, point to point, etc.

Operating environment 600 typically includes at least some form of computer readable media. Computer readable media can be any available media that can be accessed by at least one processing unit 602 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information. Computer storage media does not include communication media. Computer storage media does not include a carrier wave or other propagated or modulated data signal.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The operating environment 600 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   a processor; and
   memory including instructions which, when executed by the processor, cause the processor to:
   receive a video from a user device associated with a user, the video including a video stream and an audio stream, the video stream depicting a plurality of items to be listed in an electronic marketplace, the plurality of items being separate items and including a first item and a second item;
   process the audio stream of the video using a first trained machine learning model to convert at least a portion of the audio stream to text;
   determine a first portion of the video associated with the first item by: performing motion detection analysis of the video stream to identify a first hovering of a camera at a first portion of the video stream corresponding to the first portion of the video, and
   analyzing the text from a first portion of the audio stream to identify the first item, the first portion of the audio stream corresponding to the first portion of the video;
   determine a second portion of the video associated with the second item by:
   performing motion detection analysis of the video stream to identify a second hovering of the camera at a second portion of the video stream corresponding to the second portion of the video, and
   analyzing the text from a second portion of the audio stream to identify the second item, the second portion of the audio stream corresponding to the second portion of the video;
   responsive to determining the first portion of the video and the second portion of the video, generate a first listing for the first item and a second listing for the second item by:
   extracting a first frame from the first portion of the video stream and a second frame from the second portion of the video stream, the first frame providing a first image of the first item and the second frame providing a second image of the second item,
   analyzing the text using a second trained machine learning model to extract a first attribute category and value pair of an attribute of the first item from text associated with the first portion of the video, and a second attribute category and value pair of an attribute of the second item from text associated with the second portion of the video, and
   generating the first listing for the first item and the second listing for the second item, the first listing generated to include the first image and using the first attribute category and value pair to populate a corresponding field of the first listing, and the second listing generated to include the second image and using the second attribute category and value pair to populate a corresponding field of the second listing; and
   generating an electronic store, the electronic store including the first listing and the second listing, and causing the electronic store to be displayed to at least one potential buyer.

2. The system of claim 1, wherein the first portion of the video associated with the first item is determined by:
   determining, based on the audio stream, a timestamp identifying a time, in the video stream, that depicts the first item among the plurality of items, and
   wherein the first image of the first item is extracted from the video stream based on the timestamp.

3. The system of claim 1, wherein the instructions, when executed by the processor, cause the processor to convert the audio stream of the video to text using at least one selected from the following: i) a general purpose speech recognition model, ii) an electronic commerce language aware speech recognition model, and iii) a model trained to boost hot words associated with a product category.

4. The system of claim 3, wherein the instructions, when executed by the processor, cause the processor to extract the first attribute category and value pair of the attribute of the first item at least by analyzing, using a named entity recognition model, the text associated with the first portion of the video corresponding to the first item.

5. The system of claim 1, wherein the instructions, when executed by the processor, further cause the processor to generate, based on a plurality of modalities descriptive of the first item, a vector representing the first item.

6. The system of claim 5, wherein the instructions, when executed by the processor, cause the processor to generate the vector by applying a trained multimodal model to: i) the first image of the first item; and ii) the first attribute category and value pair of the attribute of the first item.

7. The system of claim 6, wherein the instructions, when executed by the processor, cause the processor to:
   search, using the vector representing the first item, a product catalogue to find one or more similar items listed in the electronic marketplace, and
   wherein the first listing for the first item is generated by:
   extracting one or more attributes of the one or more similar items; and
   populating one or more corresponding fields of the first listing using the one or more attributes.

8. The system of claim 1, wherein the instructions, when executed by the processor, further cause the processor to generate an electronic marketplace store, the electronic marketplace store including the first listing and the second listing.

9. A method comprising:
   receiving a video from a user device associated with a user, the video including a video stream and an audio stream, the video stream depicting a plurality of items to be listed in an electronic marketplace, the plurality of items being separate items and including a first item and a second item;
   processing the audio stream of the video using a first trained machine learning model to convert at least a portion of the audio stream to text;
   determining a first portion of the video associated with the first item by:
   performing motion detection analysis of the video stream to identify a first hovering of a camera at a first portion of the video stream corresponding to the first portion of the video, and
   analyzing the text from a first portion of the audio stream to identify the first item, the first portion of the audio stream corresponding to the first portion of the video;

determining a second portion of the video associated with
the second item by:
performing motion detection analysis of the video
stream to identify a second hovering of the camera at
a second portion of the video stream corresponding
to the second portion of the video, and
analyzing the text from a second portion of the audio
stream to identify the second item, the second portion of the audio stream corresponding to the second
portion of the video;
responsive to determining the first portion of the video
and the second portion of the video, generating a first
listing for the first item and a second listing for the
second item by:
extracting a first frame from the first portion of the
video stream and a second frame from the second
portion of the video stream, the first frame providing
a first image of the first item and the second frame
providing a second image of the second item,
analyzing the text using a second trained machine
learning model to extract a first attribute category
and value pair of an attribute of the first item from
text associated with the first portion of the video, and
a second attribute category and value pair of an
attribute of the second item from text associated with
the second portion of the video, and
generating the first listing for the first item and the
second listing for the second item, the first listing
generated to include the first image and using the
first attribute category and value pair to populate a
corresponding field of the first listing, and the second
listing generated to include the second image and
using the second attribute category and value pair to
populate a corresponding field of the second listing;
and
generating an electronic store, the electronic store
including the first listing and the second listing, and
causing the electronic store to be displayed to at least one
potential buyer.

10. The method of claim 9, wherein the first portion of the
video associated with the first item is determined by:
determining, based on the audio stream, a timestamp
identifying a time, in the video stream, that depicts the
first item among the plurality of items, and
wherein the first image of the first item is extracted from
the video stream based on the timestamp.

11. The method of claim 9, wherein the audio stream of
the video is converted to text using at least one selected from
the following: i) a general-purpose speech recognition
model, ii) an electronic commerce language aware speech
recognition model, and iii) a model trained to boost hot
words associated with a product category.

12. The method of claim 11, wherein the first attribute
category and value pair is extracted at least by analyzing,
using a named entity recognition model, the text associated
with the first portion of the video corresponding to the first
item.

13. The method of claim 9, further comprising generating,
based on a plurality of modalities descriptive of the first
item, a vector representing the first item.

14. The method of claim 13, wherein generating the
vector representing the first item comprises generating the
vector by applying a trained multimodal model to: i) the first
image of the first item; and ii) the first attribute category and
value pair of the attribute of the first item.

15. The method of claim 14, further comprising:
searching, using the vector representing the first item, a
product catalogue to find one or more similar items
listed in the electronic marketplace, and wherein the
first listing for the first item is generated by:
extracting one or more attributes of the one or more
similar items; and
populating one or more corresponding fields of the first
listing using the one or more attributes.

16. The method of claim 9, further comprising generating
an electronic marketplace store, the electronic marketplace
store including the first listing and the second listing.

17. A computer storage medium encoding computer
executable instructions that, when executed by at least one
processor, perform a method comprising:
receiving a video from a user device associated with a
user, the video including a video stream and an audio
stream, the video stream depicting a plurality of items
to be listed in an electronic marketplace, the plurality of
items being separate items and including a first item
and a second item;
processing the audio stream of the video using a first
trained machine learning model to convert at least a
portion of the audio stream to text;
determining a first portion of the video associated with
the first item by:
performing motion detection analysis of the video
stream to identify a first hovering of a camera at a
first portion of the video stream corresponding to the
first portion of the video, and
analyzing the text from a first portion of the audio
stream to identify the first item, the first portion of
the audio stream corresponding to the first portion of
the video;
determining a second portion of the video associated with
the second item by:
performing motion detection analysis of the video
stream to identify a second hovering of a camera at
a second portion of the video stream corresponding
to the second portion of the video, and
analyzing the text from a second portion of the audio
stream to identify the second item, the second portion of the audio stream corresponding to the second
portion of the video;
responsive to determining the first portion of the video
and the second portion of the video, generating a first
listing for the first item and a second listing for the
second item by:
extracting a first frame from the first portion of the
video stream and a second frame from the second
portion of the video stream, the first frame providing
a first image of the first item and the second frame
providing a second image of the second item,
analyzing the text using a second trained machine
learning model to extract a first attribute category
and value pair of an attribute of the first item from
text associated with the first portion of the video, and
a second attribute category and value pair of an
attribute of the second item from text associated with
the second portion of the video,
generating the first listing for the first item and the
second listing for the second item, the first listing
generated to include the first image and using the
first attribute category and value pair to populate a
corresponding field of the first listing, and the second listing generated to include the second image and using the second attribute category and value pair to populate a corresponding field of the second listing, and generating an electronic store, the electronic store including the first listing and the second listing, and causing the electronic store to be displayed to at least one potential buyer.

18. The system of claim 1, wherein the first portion of the video associated with the first item is further determined by analyzing the text from the first portion of the audio stream to identify a first audio cue.

19. The method of claim 9, wherein the first portion of the video associated with the first item is further determined by analyzing the text from the first portion of the audio stream to identify a first audio cue.

* * * * *